United States Patent
Maejima et al.

(10) Patent No.: US 6,718,396 B1
(45) Date of Patent: Apr. 6, 2004

(54) NETWORK STRUCTURE METHOD AND ROUTE DETERMINATION EQUIPMENT

(75) Inventors: Yasuhito Maejima, Fujisawa (JP); Hideaki Yabe, Odawara (JP)

(73) Assignee: Hitachi, Ltd., Tokyo (JP)

( * ) Notice: Subject to any disclaimer, the term of this patent is extended or adjusted under 35 U.S.C. 154(b) by 563 days.

(21) Appl. No.: 09/631,950

(22) Filed: Aug. 3, 2000

(30) Foreign Application Priority Data

Aug. 4, 1999 (JP) .......................................... 11-220845

(51) Int. Cl.$^7$ .............................................. G06F 15/16
(52) U.S. Cl. ....................... 709/249; 709/242; 709/243; 709/221; 370/252; 370/253
(58) Field of Search ................................. 709/242, 243, 709/238, 249, 222, 221; 370/252, 253

(56) References Cited

U.S. PATENT DOCUMENTS

| | | | | |
|---|---|---|---|---|
| 5,712,981 A | * | 1/1998 | McKee et al. ............... | 709/241 |
| 6,298,044 B1 | * | 10/2001 | Britt ........................... | 370/252 |
| 6,298,381 B1 | * | 10/2001 | Shah et al. .................. | 709/228 |
| 6,392,997 B1 | * | 5/2002 | Chen ........................... | 370/252 |
| 6,473,421 B1 | * | 10/2002 | Tappan ....................... | 370/351 |
| 6,538,416 B1 | * | 3/2003 | Hahne et al. ................ | 370/431 |
| 6,553,423 B1 | * | 4/2003 | Chen ........................... | 709/230 |

OTHER PUBLICATIONS

Rekhter et al., "A Border Gateway Protocol 4 (BGP–4)," RFC 1771 , Mar. 1995, pp. 1–57 , printed from http://www.cis.ohio–state.edu/cgi–bin/rfc/rfc1771.*

Rekhter et al., "Application of the Border Gateway Protocol in the Internet," RFC 1772, Mar. 1995, pp. 1–19 , printed from http://www.cis.ohio–state.edu/cgi–bin/rfc/rfc1772.*

Traina, "Autonomous System Confederations for BGP," RFC 1965, Jun. 1996, pp. 1–7 , printed from http://www-.cis.ohio–state.edu/cgi–bin/rfc/rfc1965.*

Paxon, "End–to–End Routing Behavior on the Internet," IEEE/ACM Transactions on Networking, vol. 5, No. 5, Oct. 1997 , pp 601–615.*

* cited by examiner

Primary Examiner—Glenton B. Burgess
Assistant Examiner—Bradley Edelman
(74) Attorney, Agent, or Firm—Antonelli, Terry, Stout & Kraus, LLP

(57) ABSTRACT

In the Internet having a plurality of autonomous systems interconnected, fast routing can be made. The autonomous systems constituting the Internet or the like are divided into groups. The border routers of one group share routing information of the group, and the border routers of another group share routing information of the group. Each border router has a unit for separating a desired one from the autonomous systems of a corresponding group or consolidating an autonomous system of another group into the corresponding group, so that the amount of the routing information held can be adapted to the processing ability of the border routers within that group.

2 Claims, 20 Drawing Sheets

FIG. 3

ROUTER a11 — 400

| No. | ADDRESS | OUTPUT |
|---|---|---|
| 1 | 123.1 | PORT 3 |
| 2 | 123.8 | PORT 2 |
| 3 | 128.15 | PORT 1 |
| 4 | 130.20 | PORT 1 |
| 5 | 135.11 | PORT 1 |
| 6 | 139.87 | PORT 1 |
| 7 | 141.10 | PORT 2 |
| 8 | 144.3 | PORT 2 |
| 9 | 144.115 | PORT 2 |
| ⋮ | | |
| 2081 | OTHERS | PORT 1 |

FIG. 4

ROUTER a11 — 410

| No. | ADDRESS | OUTPUT |
|---|---|---|
| 1 | 123.1 | PORT 3 |
| 2 | 123.8 | PORT 2 |
| 3 | 128.15 | PORT 1 |
| ⋮ | | |
| 814 | OTHERS | PORT 1 |

FIG. 5A

401 — BORDER ROUTER a1

| No. | ADDRESS | OUTPUT |
|---|---|---|
| 1 | 123.1 | PORT 2 |
| 2 | 123.8 | PORT 3 |
| 3 | 128.15 | PORT 11 |
| 4 | 130.20 | BORDER ROUTER c1 |
| 5 | 135.11 | BORDER ROUTER c1 |
| 6 | 139.87 | BORDER ROUTER c1 |
| 7 | 141.10 | BORDER ROUTER c1 |
| 8 | 144.3 | BORDER ROUTER c1 |
| 9 | 144.115 | BORDER ROUTER c1 |
| ... | | |
| 2081 | OTHERS | BORDER ROUTER c1 |

FIG. 5B

402 — BORDER ROUTER a2

| No. | ADDRESS | OUTPUT |
|---|---|---|
| 1 | 123.1 | PORT 4 |
| 2 | 123.8 | PORT 2 |
| 3 | 128.15 | PORT 8 |
| 4 | 130.20 | BORDER ROUTER b1 |
| 5 | 135.11 | BORDER ROUTER b1 |
| 6 | 139.87 | BORDER ROUTER b1 |
| 7 | 141.10 | BORDER ROUTER b1 |
| 8 | 144.3 | BORDER ROUTER b1 |
| 9 | 144.115 | BORDER ROUTER b1 |
| ... | | |
| 2081 | OTHERS | BORDER ROUTER b1 |

FIG. 5C

403 — BORDER ROUTER b1

| No. | ADDRESS | OUTPUT |
|---|---|---|
| 1 | 123.1 | BORDER ROUTER a2 |
| 2 | 123.8 | BORDER ROUTER a2 |
| 3 | 128.15 | BORDER ROUTER a2 |
| 4 | 130.20 | PORT 7 |
| 5 | 135.11 | PORT 10 |
| 6 | 139.87 | PORT 3 |
| 7 | 141.10 | BORDER ROUTER c1 |
| 8 | 144.3 | BORDER ROUTER c1 |
| 9 | 144.115 | BORDER ROUTER c1 |
| ... | | |
| 2081 | OTHERS | BORDER ROUTER c1 |

FIG. 5D

BORDER ROUTER c1

| No. | ADDRESS | OUTPUT |
|---|---|---|
| 1 | 123.1 | BORDER ROUTER a1 |
| 2 | 123.8 | BORDER ROUTER a1 |
| 3 | 128.15 | BORDER ROUTER a1 |
| 4 | 130.20 | BORDER ROUTER b1 |
| 5 | 135.11 | BORDER ROUTER b1 |
| 6 | 139.87 | BORDER ROUTER b1 |
| 7 | 141.10 | PORT 3 |
| 8 | 144.3 | PORT 3 |
| 9 | 144.115 | PORT 15 |
| ... | | |
| 2081 | OTHERS | BORDER ROUTER d1 |

BORDER ROUTER d1

| No. | ADDRESS | OUTPUT |
|---|---|---|
| 1 | 70.2 | PORT 12 |
| 2 | 78.211 | PORT 5 |
| 3 | 89.182 | PORT 2 |
| 4 | 150.46 | BORDER ROUTER a1 |
| 5 | 153.12 | BORDER ROUTER a1 |
| 6 | 158.5 | BORDER ROUTER a1 |
| ... | | |
| 794 | OTHERS | BORDER ROUTER a1 |

BORDER ROUTER e1

| No. | ADDRESS | OUTPUT |
|---|---|---|
| 1 | 70.2 | BORDER ROUTER d1 |
| 2 | 78.211 | BORDER ROUTER d1 |
| 3 | 89.182 | BORDER ROUTER d1 |
| 4 | 150.46 | PORT 11 |
| 5 | 153.12 | PORT 6 |
| 6 | 158.5 | PORT 3 |
| ... | | |
| 794 | OTHERS | BORDER ROUTER d1 |

411 — BORDER ROUTER a1

| No. | ADDRESS | OUTPUT |
|-----|---------|--------|
| 1 | 123.1 | PORT 2 |
| 2 | 123.8 | PORT 3 |
| 3 | 128.15 | PORT 11 |
| ... | | |
| B14 | OTHERS | BORDER ROUTER c1 |

FIG. 6B

412 — BORDER ROUTER a2

| No. | ADDRESS | OUTPUT |
|-----|---------|--------|
| 1 | 123.1 | PORT 4 |
| 2 | 123.8 | PORT 2 |
| 3 | 128.15 | PORT 8 |
| ... | | |
| B14 | OTHERS | BORDER ROUTER b1 |

FIG. 6C

413 — BORDER ROUTER b1

| No. | ADDRESS | OUTPUT |
|-----|---------|--------|
| 1 | 130.20 | PORT 7 |
| 2 | 135.11 | PORT 10 |
| 3 | 109.87 | PORT 3 |
| ... | | |
| B14 | OTHERS | BORDER ROUTER c1 |

FIG. 6D

414 — BORDER ROUTER c1

| No. | ADDRESS | OUTPUT |
|-----|---------|--------|
| 1 | 141.10 | PORT 8 |
| 2 | 144.3 | PORT 3 |
| 3 | 144.115 | PORT 15 |
| ... | | |
| 758 | OTHERS | BORDER ROUTER d1 |

FIG. 6E

415 — BORDER ROUTER d1

| No. | ADDRESS | OUTPUT |
|-----|---------|--------|
| 1 | 70.2 | PORT 12 |
| 2 | 78.211 | PORT 5 |
| 3 | 89.182 | PORT 2 |
| ... | | |
| 375 | OTHERS | BORDER ROUTER c1 |

FIG. 6F

416 — BORDER ROUTER e1

| No. | ADDRESS | OUTPUT |
|-----|---------|--------|
| 1 | 150.46 | PORT 11 |
| 2 | 153.12 | PORT 6 |
| 3 | 158.5 | PORT 3 |
| ... | | |
| 420 | OTHERS | BORDER ROUTER d1 |

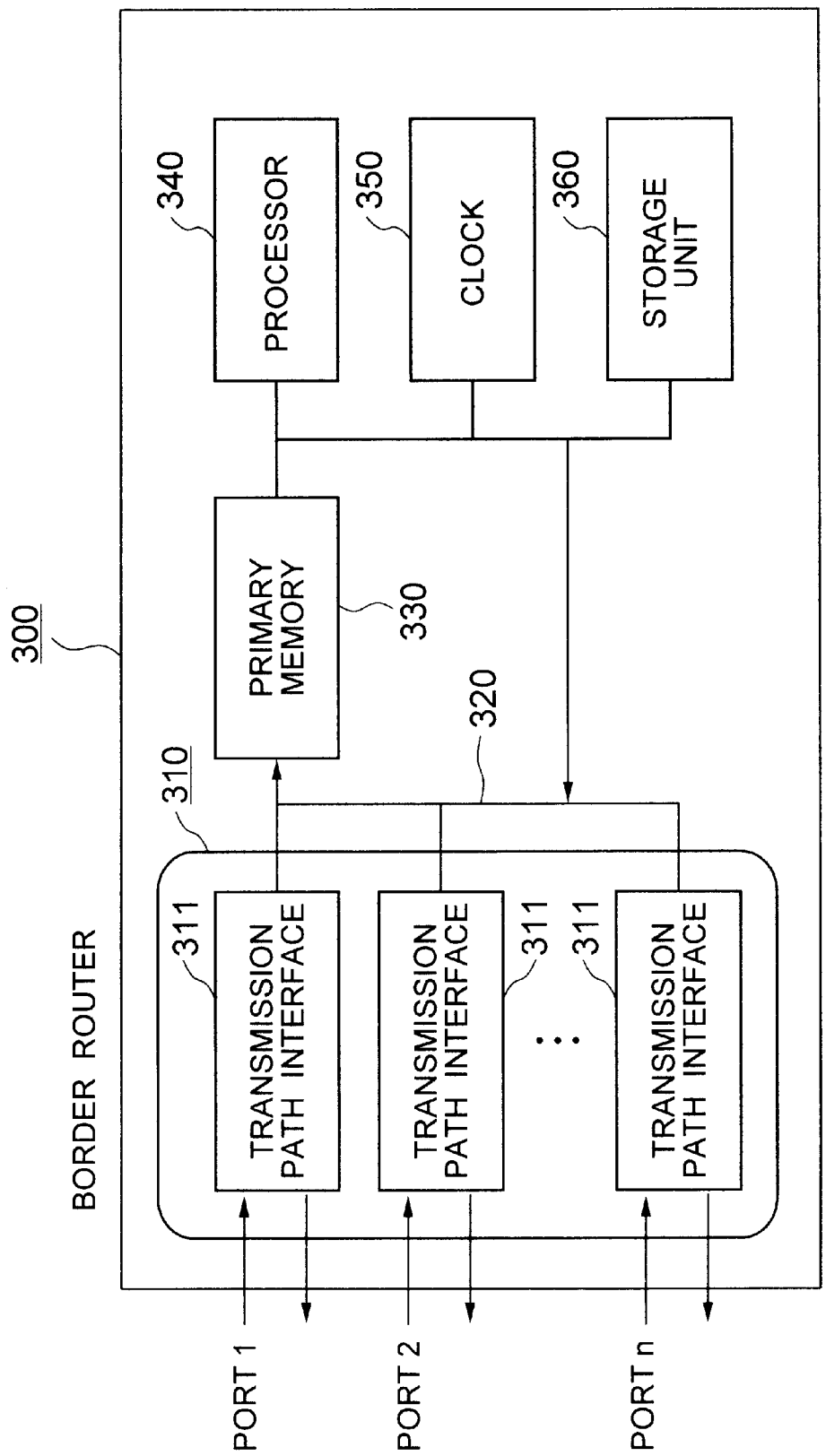

FIG. 18A

421 — BORDER ROUTER a1

| No. | ADDRESS | OUTPUT |
|---|---|---|
| 1 | 123.1 | PORT 2 |
| 2 | 123.8 | PORT 3 |
| 3 | 128.15 | PORT 11 |
| 4 | 130.20 | BORDER ROUTER a2 |
| 5 | 136.11 | BORDER ROUTER a2 |
| 6 | 139.87 | BORDER ROUTER a2 |
| ... | | |
| 794 | OTHERS | BORDER ROUTER c1 |

FIG. 18B

422 — BORDER ROUTER a2

| No. | ADDRESS | OUTPUT |
|---|---|---|
| 1 | 123.1 | PORT 2 |
| 2 | 123.8 | PORT 3 |
| 3 | 128.15 | PORT 11 |
| 4 | 130.20 | BORDER ROUTER b1 |
| 5 | 136.11 | BORDER ROUTER b1 |
| 6 | 139.87 | BORDER ROUTER b1 |
| ... | | |
| 794 | OTHERS | BORDER ROUTER b1 |

FIG. 18C

423 — BORDER ROUTER b1

| No. | ADDRESS | OUTPUT |
|---|---|---|
| 1 | 123.1 | BORDER ROUTER a2 |
| 2 | 123.8 | BORDER ROUTER a2 |
| 3 | 128.15 | BORDER ROUTER a2 |
| 4 | 130.20 | PORT 3 |
| 5 | 136.11 | PORT 10 |
| 6 | 139.87 | PORT 3 |
| ... | | |
| 794 | OTHERS | BORDER ROUTER c1 |

FIG. 18 D

BORDER ROUTER c1 — 424

| No. | ADDRESS | OUTPUT |
|---|---|---|
| 1 | 141.10 | PORT 8 |
| 2 | 144.3 | PORT 3 |
| 3 | 144.115 | PORT 15 |
| 4 | 70.2 | BORDER ROUTER d1 |
| 5 | 78.211 | BORDER ROUTER d1 |
| 6 | 89.182 | BORDER ROUTER d1 |
| 7 | 150.46 | BORDER ROUTER d1 |
| 8 | 153.12 | BORDER ROUTER d1 |
| 9 | 158.5 | BORDER ROUTER d1 |
| ... | | |
| 1551 | OTHERS | BORDER ROUTER d1 |

FIG. 18 E

BORDER ROUTER d1 — 425

| No. | ADDRESS | OUTPUT |
|---|---|---|
| 1 | 141.10 | BORDER ROUTER c1 |
| 2 | 144.3 | BORDER ROUTER c1 |
| 3 | 144.115 | BORDER ROUTER c1 |
| 4 | 70.2 | PORT 12 |
| 5 | 78.211 | PORT 5 |
| 6 | 89.182 | PORT 2 |
| 7 | 150.46 | BORDER ROUTER e1 |
| 8 | 153.12 | BORDER ROUTER e1 |
| 9 | 158.5 | BORDER ROUTER e1 |
| ... | | |
| 1551 | OTHERS | BORDER ROUTER c1 |

FIG. 18 F

BORDER ROUTER e1 — 426

| No. | ADDRESS | OUTPUT |
|---|---|---|
| 1 | 141.10 | BORDER ROUTER d1 |
| 2 | 144.3 | BORDER ROUTER d1 |
| 3 | 144.115 | BORDER ROUTER d1 |
| 4 | 70.2 | BORDER ROUTER d1 |
| 5 | 78.211 | BORDER ROUTER d1 |
| 6 | 89.182 | BORDER ROUTER d1 |
| 7 | 150.46 | PORT 11 |
| 8 | 153.12 | PORT 6 |
| 9 | 158.5 | PORT 3 |
| ... | | |
| 1551 | OTHERS | BORDER ROUTER d1 |

NETWORK STRUCTURE METHOD AND ROUTE DETERMINATION EQUIPMENT

BACKGROUND OF THE INVENTION

The present invention generally relates to a network system such as Internet through which individually managed and operated networks are interconnected, and particularly to a network structure method for increasing the speed of the routing that determines what route is used to transmit communication information of packets with destination address added, and to a router for use in this method.

The transmission of communication information through Internet or the like in which individually managed and operated networks are mutually connected is not performed as in the telephone network in which the operation and management of networks are centralized to connect the information transmitting person and the receiving person and to transmit information therebetween. An address capable of unique identification on network is assigned to each computer site or machine, and a packet with the destination address is transmitted to the opponent. In this case, the route determination equipment connected in networks, called as router, is used to control the routing. The router within each network has a routing table on which address information of its own network and neighbor networks are registered, and refers to this table, thus routing to determine the necessary route.

The conventional routing control in this Internet or the like can be divided into two routing controls: routing control between networks each of which is operated on the same management power called autonomous system (abbreviated AS) and routing control within an AS. For example, when a network constructed by connecting a plurality of LANs present within one corporation through a router is managed and operated by the company-wide department, this network corresponds to AS. Routing information exchange within an AS is performed by routing protocol called IGP (Internal Gateway Protocol), and routing information exchange between ASs by routing protocol called EGP (External Gateway Protocol). A router for the connection and route control between adjacent ASs is called border router. The border router produces a list of routes (routing table) from the routing information obtained by IGP and EGP. When, an address for new equipment is added within the own AS, the routing table of the border router is changed according to the addition by use of IGP, and the change is transmitted to border routers of other ASs by use of EGP.

Recently, the Internet has been complicated as a result of interconnection of a large number of networks. On the other hand, the route determination equipment such as border router has a limit to the amount of address to be stored because the routing information acquisition and routing process speed are restricted. Therefore, the present route determination equipment cannot hold all the address information in the Internet, but can hold only the address information chiefly of networks physically and logically near to the own network (AS). If the amount of address that the route determination equipment holds is less than all the address in the Internet, packets with destination not specified increase, resulting in performance deterioration of all networks. Thus, it is necessary not to increase the amount of routing information that each route determination equipment holds, and not to deteriorate the performance of networks.

In addition, the present information processor often works with other information processors connected to networks to treat information. Therefore, it is important to consider the situations of the networks and the load on the information processor of the linked opponent, and it is necessary to swiftly make route determination.

SUMMARY OF THE INVENTION

It is an object of the invention to enable fast routing to be made in Internet or the like in which a plurality of individually managed and operated autonomous systems are interconnected, and information processors on networks to smoothly communicate with each other.

According to the invention, the autonomous systems that constitute the network system are divided into groups, and routing information is taken around between the route determination equipment (border routers) of the autonomous systems of each group, or the routers of the same group share common routing information. The route determination equipment has means for separating a desired autonomous system of the corresponding group or consolidating autonomous systems of other groups into its own group in accordance with the input/output traffic to or from the corresponding group, thereby making it possible to hold routing information necessary for the processing ability within the group.

BRIEF DESCRIPTION OF THE DRAWINGS

FIG. 3 shows one example of the routing table of a router within AS in the network shown in FIG. 1.

FIG. 4 shows one example of the routing table of a router within AS in the conventional network shown in FIG. 2.

FIGS. 5A–5F show an example of the routing tables of AS border routers in the network shown in FIG. 1.

FIGS. 6A–6F show an example of the routing tables of AS border routers in the conventional network shown in FIG. 2.

FIG. 7 is a block diagram of an embodiment of the border router.

FIGS. 18A–18F show an example of the routing tables of AS border routers in the network shown in FIG. 17.

DESCRIPTION OF THE EMBODIMENTS

One embodiment of the invention will be described with reference to the accompanying drawings.

Figure 1:
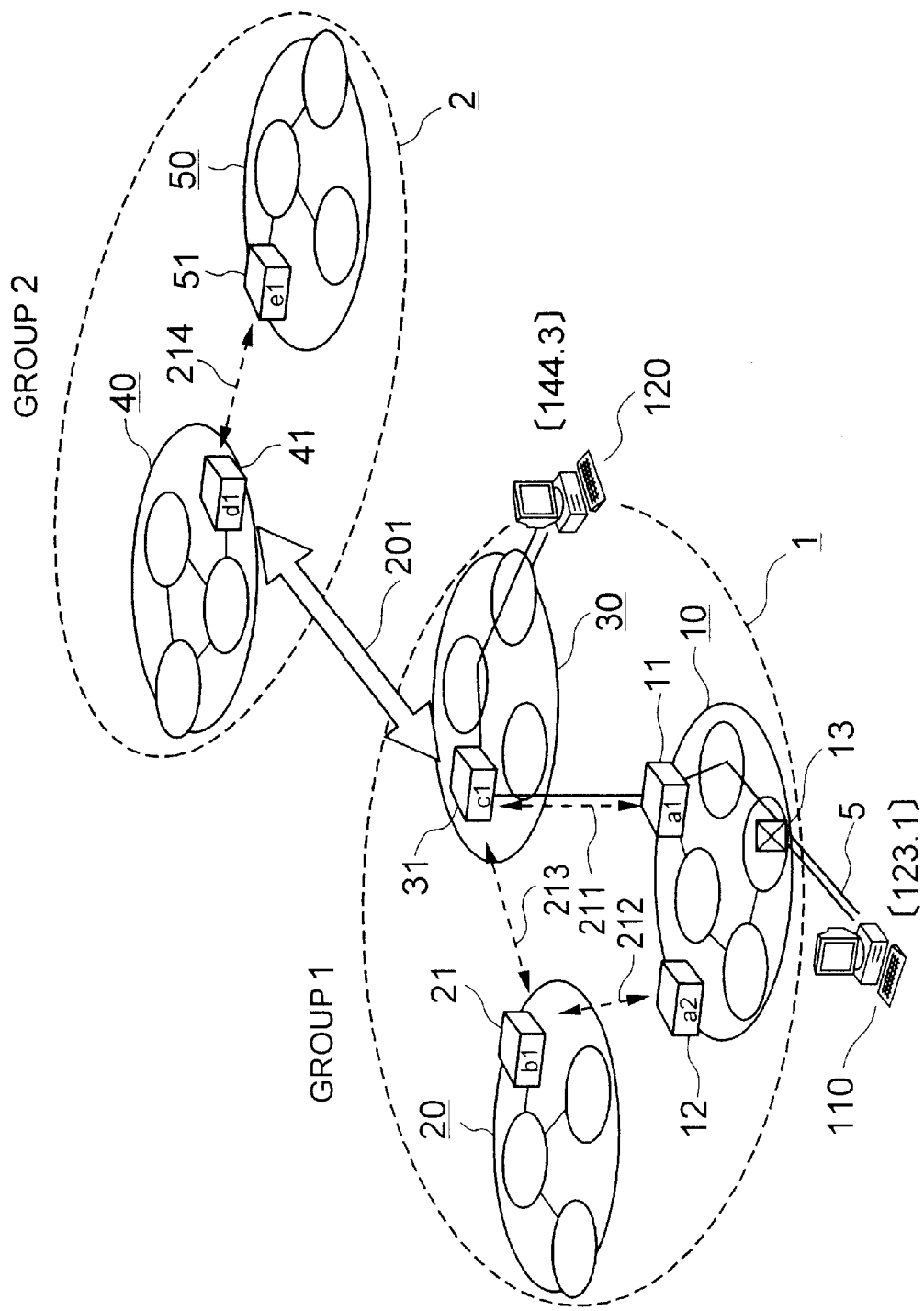
FIG. 1 shows one embodiment of a network structure according to the invention.

FIG. 1 shows an embodiment of a network structure of the invention in which routing information is shared by ASs of each group. Referring to FIG. 1, there is shown a group 1 which is formed of autonomous systems AS-A10, AS-B20, AS-C30. The autonomous systems 10, 20, 30 share routing information. Similarly, there is a group 2 which is formed of autonomous systems AS-D40, AS-E50. The autonomous systems 40, 50 share routing information. Each of the autonomous systems AS10–50 has one or more border routers. For example, the autonomous system AS-A10 has a border router (a1) 11, a border router (a2) 12, and the autonomous system AS-B20 has a border router (b1) 21, and the autonomous system AS-C30 has a border router (c1) 31. Moreover, the autonomous system AS-D40 has a border router (d1) 41, and the autonomous system AS-E50 has a border router (e1) 51.

The autonomous systems within the same group mutually transmit and receive information by use of an intragroup protocol. For example, within group 1 the border router (a1) 11 and border router (c1) 31 mutually transmit and receive necessary information (routing information, information about group separation/consolidation and so on) by use of an intragroup protocol 211, the border router (a2) 12 and border router (b1) 21 by use of an intragroup protocol 212, and the border router (b1) 21 and border router (c1) 31 by use of an intragroup protocol 213. Similarly within group 2, the border router (d1) 41 and border router (e1) 51 transmit and receive necessary information by use of an intragroup protocol 214. The border routers of opposite groups, or border routers opposed through the boundary between groups transmit and receive routing information and so on by use of an intergroup protocol. For example, since the border router (c1) 31 belongs to group 1, the border router (d1) 41 to other group 2, these two border routers (c1) 31, (d1) 41 transmit and receive necessary information by use of an intergroup protocol 201.

Figure 2:
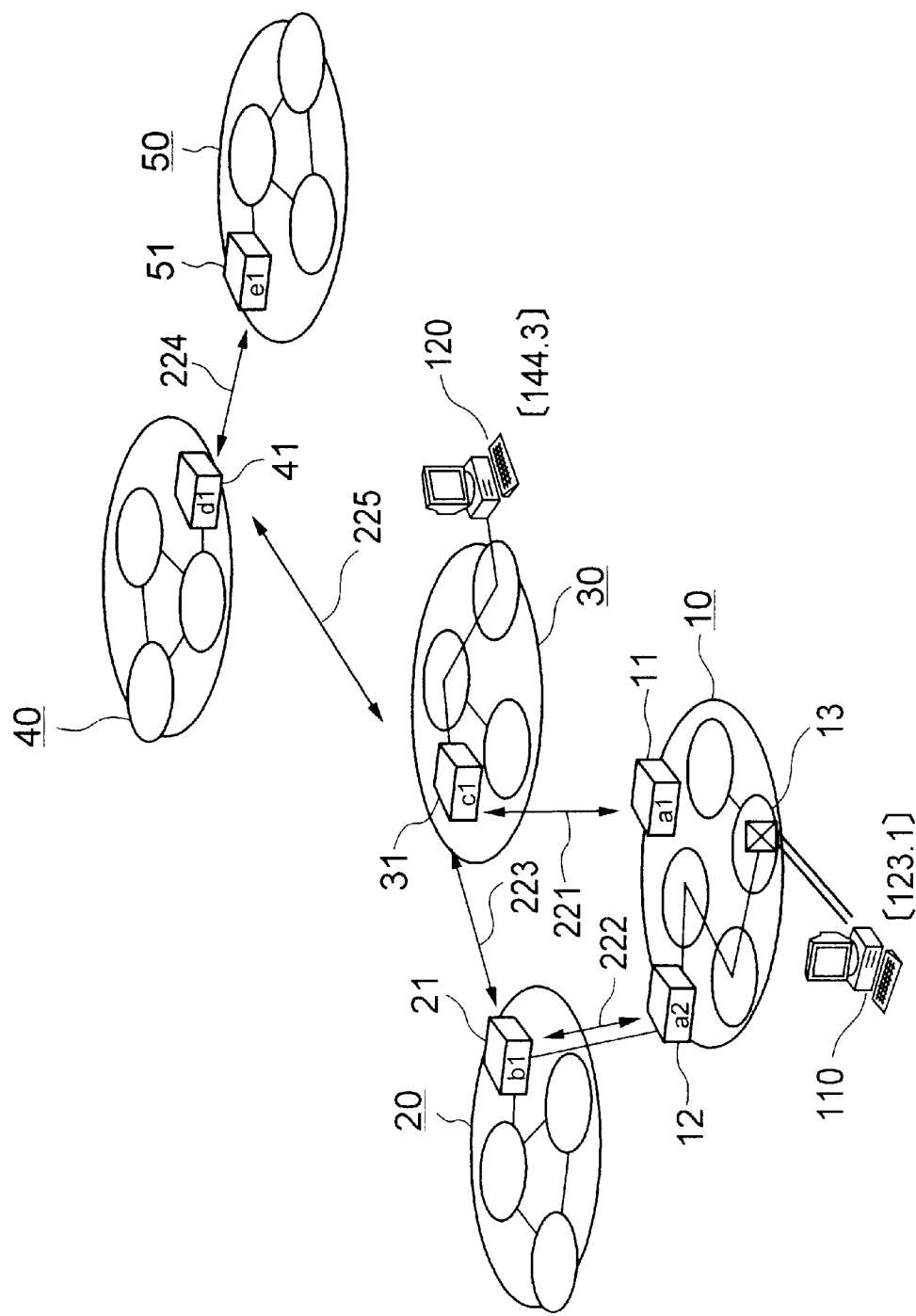
FIG. 2 shows an example of a conventional network structure.

FIG. 2 shows a conventional network structure corresponding to that shown in FIG. 1. The opposite border routers of autonomous systems transmit and receive routing information by use of EGP as a conventional routing protocol. For example, in FIG. 2 the border router (a1) 11 of the autonomous system AS-A10 and the border router (c1) 31 of the autonomous system AS-C30 transmit and receive routing information by use of EGP 221, the border router (a2) 12 of the autonomous system AS-A10 and the border router (b1) 21 of the autonomous system AS-B20 by use of EGP 222, and the border router (b1) 21 and border router (c1) 31 by use of EGP 223.

Similarly, the border router (d1) 41 of the autonomous system AS-D40 and the border router (e1) 51 of the autonomous system AS-E50 transmit and receive routing information by use of EGP 224. Moreover, the border router (c1) 31 and border router (d1) 41 transmit and receive routing information by use of EGP 225.

A description will be made of the routing operation in the network structure of the invention in which each group uses common routing information as shown in FIG. 1, and of the routing operation in the conventional network structure shown in FIG. 2. In these routing operations, it is assumed that a packet is transmitted from a terminal (1) 110 connected to the autonomous system AS-A10 to a terminal (2) 120 of the autonomous system AS-C30.

For convenience of explanation, the network address of the terminal (1) 110 is represented by "123.1", and the network address of the terminal (2) 120 by "144.3". The routing table of the router (all) 13 within the AS-A10 in the network structure shown in FIG. 1 is as shown in FIG. 3 at 400, and the routing table of router (all) 13 within the AS-A10 in the network structure shown in FIG. 2 is as shown in FIG. 4 at 410. Moreover, the routing tables of border routers (a1) 11, (a2) 12, (b1) 21, (c1) 31, (d1) 41, (e1) 51 of ASs in the network structure shown in FIG. 1 are as shown in FIGS. 5A–5F at 401–406. The rout information ables of border routers (a1) 11, (a2) 12, (b1) 21, (c1) 31, (d1) 41, (e1) 51 of ASs in the network structure shown in FIG. 2 are as shown in FIGS. 6A–6F at 411–416.

The routing operation in the conventional network structure without grouping as in FIG. 2 will be described first.

The terminal (1) 110 is connected to the router (all) 13 within AS-A10. When a packet to request for connecting to the network address "144.3" indicating the terminal (2) 120 is sent from the terminal (1) 110 to the router (all) 13 within the AS-AID, the router (all) 13 determines an output port by use of the routing table 410 in FIG. 4. Here, since the network address "144.3" is not present in the address column of the routing table 410, it is decided as other address, and the output port is decided to be port 1. After a similar operation is performed in routers within the autonomous system AS-A10, the packet arrives at the border router (a2) 12 of the AS-A10. The border router (a2) 12 determines an output port by referring to the routing table 412 shown in FIG. 6B.

Here, since the network address "144.3" is again not given on the address column of the routing table 412, it is decided to be other address, and the packet is sent to the border router (b1) 21 of the AS-B2. The border router (b1) 21 determines an output port by referring to the routing table 413 shown in FIG. 6C. Here, since the network address "144.3" is again not listed on the address column of the routing table 413, it is decided to be other address, and the packet is supplied to the border router (c1) 31 of the AS-C30. Consequently, the packet arrives at the border router (c1) 31 of the AS-C30. The border router (c1) 31 determines an output port by referring to the routing table 414 shown in FIG. 6D. Here, the network address "144.3" is given on the address column of the routing table 414, and the output port is found to be port 3.

Then, the packet reaches the terminal (2) 120 through routers within the autonomous system AS-C30.

A description will be made of the routing operation of the network structure with the grouping idea introduced according to the invention as shown in FIG. 1.

The autonomous systems AS-A10, AS-B20 and AS-C30 all belong to group 1, and share routing information. Therefore, when the terminal (1) 110 and terminal (2) 120 are communicated with each other, the network address information associated with the autonomous system AS-C30 is held in each router within the autonomous system AS-A10 because the autonomous system AS-A10 to which the terminal (1) 110 belongs and he autonomous system AS-C30 to which the terminal (2) 120 belongs are within the same group. Therefore, when a packet to request for connecting to the network address "144.3" that indicates the terminal (2) 120 is sent from the terminal (1) 110 to the router (all) 13 within the AS-A10, the route information table 400 of router (all) 13 shown in FIG. 3 includes the network address "144.3" on the address column. The router (all) 13 specifies port 2 for the output port by referring to this routing table 400. The same operation is performed in routers within the AS-A10, and the packet arrives at the border router (a1) 11 of the AS-A10. The border router (a1) 11 determines an output port by referring to the routing table 401 shown in FIG. 5A. Here, the network address "144.3" is again given on the routing table 401, and the border router (a1) 11 determines an output port to the border router (c1) 31. Thus, the packet can reach the border router (c1) 31 of the AS-C30 along substantially the shortest path without being fed to the other port as an indefinite output port. The border router (c1) 31 determines an output port by referring to the routing table 404 shown in FIG. 5D. Here, the network address "144.3" is given on the routing table 404, and the output port is found to be port 3.

Then, the packet arrives at the terminal (2) 120 by way of routers within the AS-C30.

In the network structure with the grouping idea introduced according to the invention as shown in FIG. 1, since the ASs in the same group share route information, the routers of each AS can hold relatively much more routing information, enabling the different ASs to surely and smoothly transmit and receive packets. In the conventional network structure with the grouping idea not introduced as shown in FIG. 2, however, the routers of each AS hold less routing information, and thus the transmission and reception of packets between the different ASs cannot be smoothly performed with the result that the connecting operation becomes often difficult.

FIG. 7 is a block diagram of an example of the AS border router used in the routing information sharing network structure according to the invention. A border router 300 includes a transmission path interface unit 310 formed of transmission path interfaces 311 for the respective ports, a data bus 320, a primary memory 330, a processor 340, a clock 350, and a storage unit 360.

Referring to FIG. 7, the primary memory 330 serves as a buffer memory for temporarily storing packets that the transmission path interface unit 310 receives. The storage unit has routing tables held as shown in FIGS. 5A–5F. The processor 340 responds to the packets from the primary memory 330 to determine an output port by referring to the routing table stored in the storage unit 360 and to send the packets through the transmission path interface 311 associated with this output port. This processor 340, for example, transmits or receives routing information to or from the AS border routers within a group or over groups and the routers within AS through the transmission path interface unit 310 during a predetermined time or if necessary, thereby renewing the routing table stored within the storage unit 360. Moreover, the processor 340 checks the amount of traffic to decide if an AS is separated from the corresponding group or united in other group. Even when the separation and consolidation are carried out, the processor 340 similarly transmits and receives routing information to update the routing table stored in the storage unit 360.

FIGS. 8 through 16 are diagrams to which reference is made in explaining the process to separate AS from group or consolidate AS into group. The border routers within a group exchange information with each other for a certain time or as the need arises, thereby grasping the traffic conditions of each AS of the group. Thus, in the routing information sharing network structure of the invention, the group formed of autonomous systems can be changed according to the situations of network such as the increase of traffic.

Figure 8:
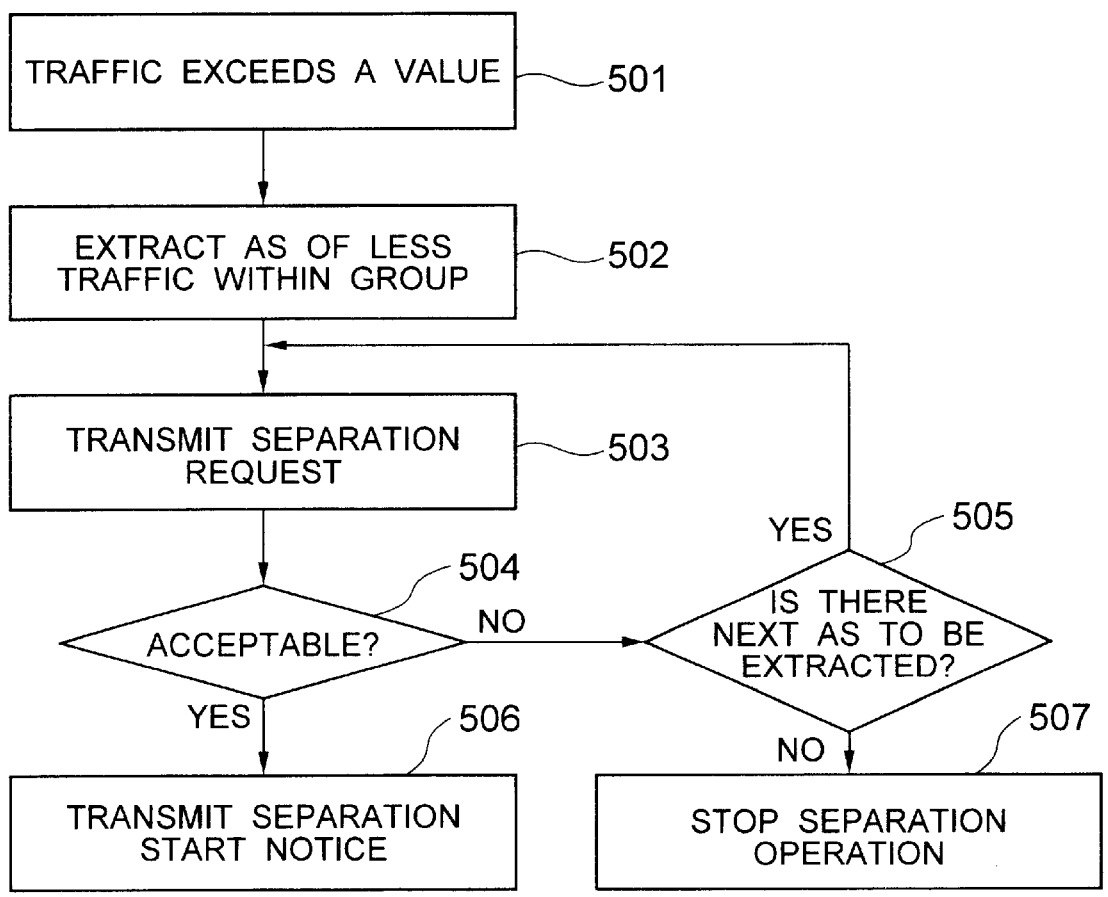
FIG. 8 is a flowchart for request to separate from a group.
Figure 9:
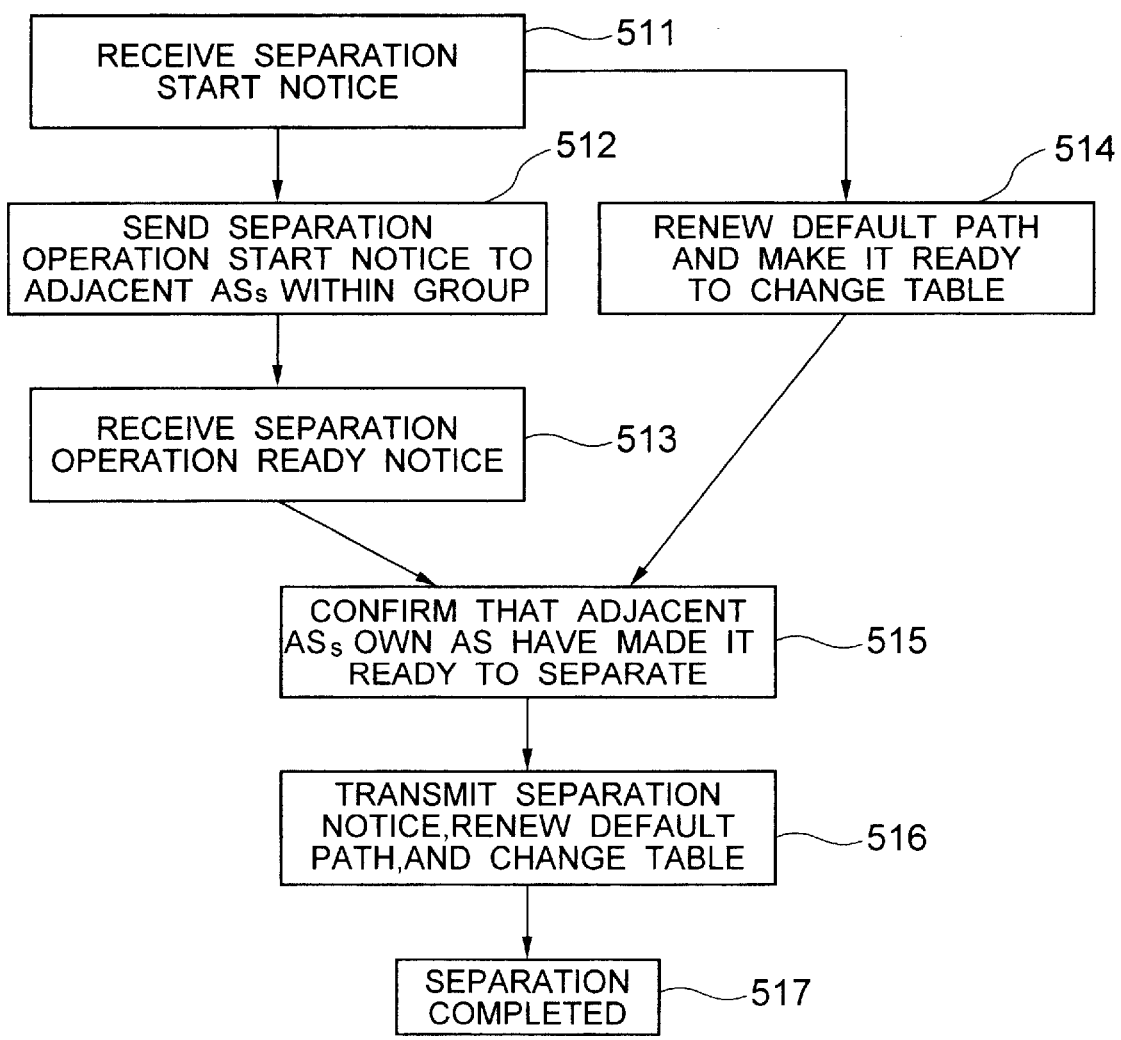
FIG. 9 is a flowchart for separation of AS to be separated from a group.
Figure 10:
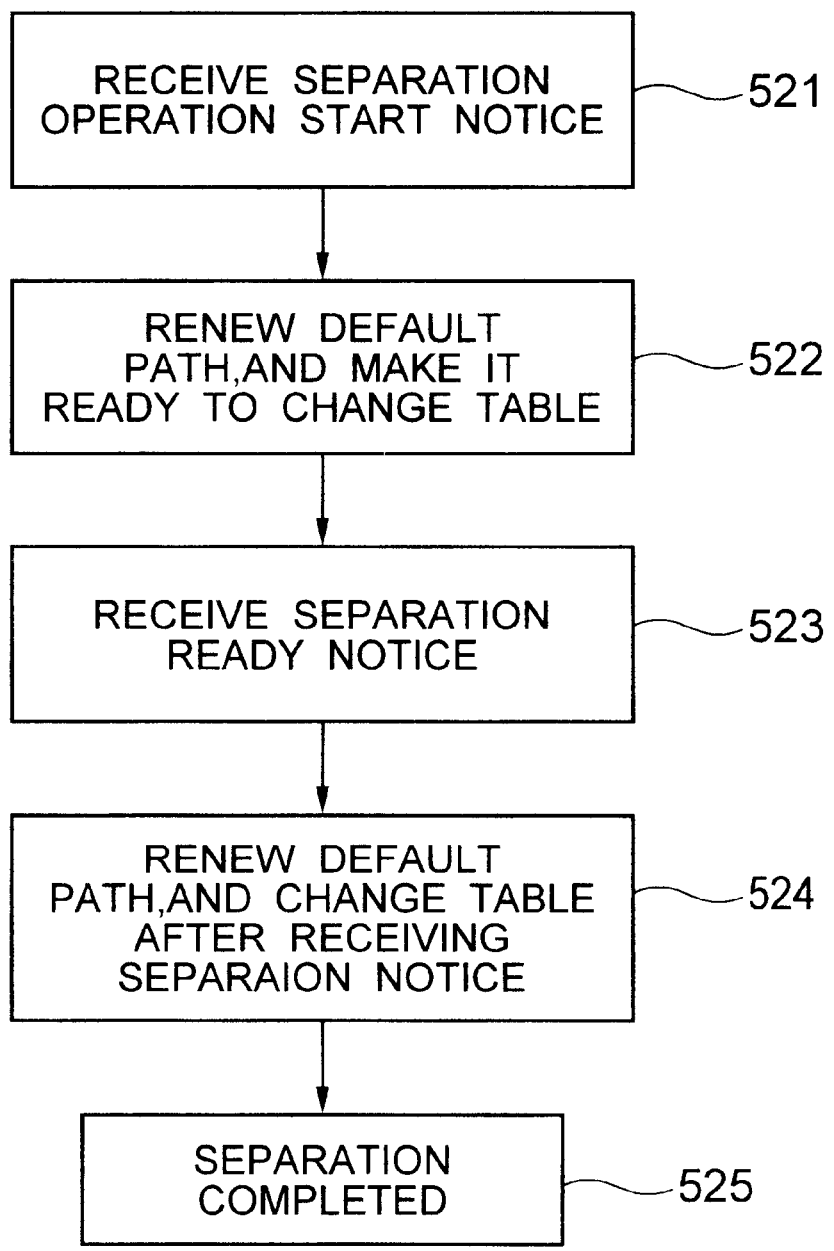
FIG. 10 is a flowchart for separation in AS to stay in group.
Figure 11:
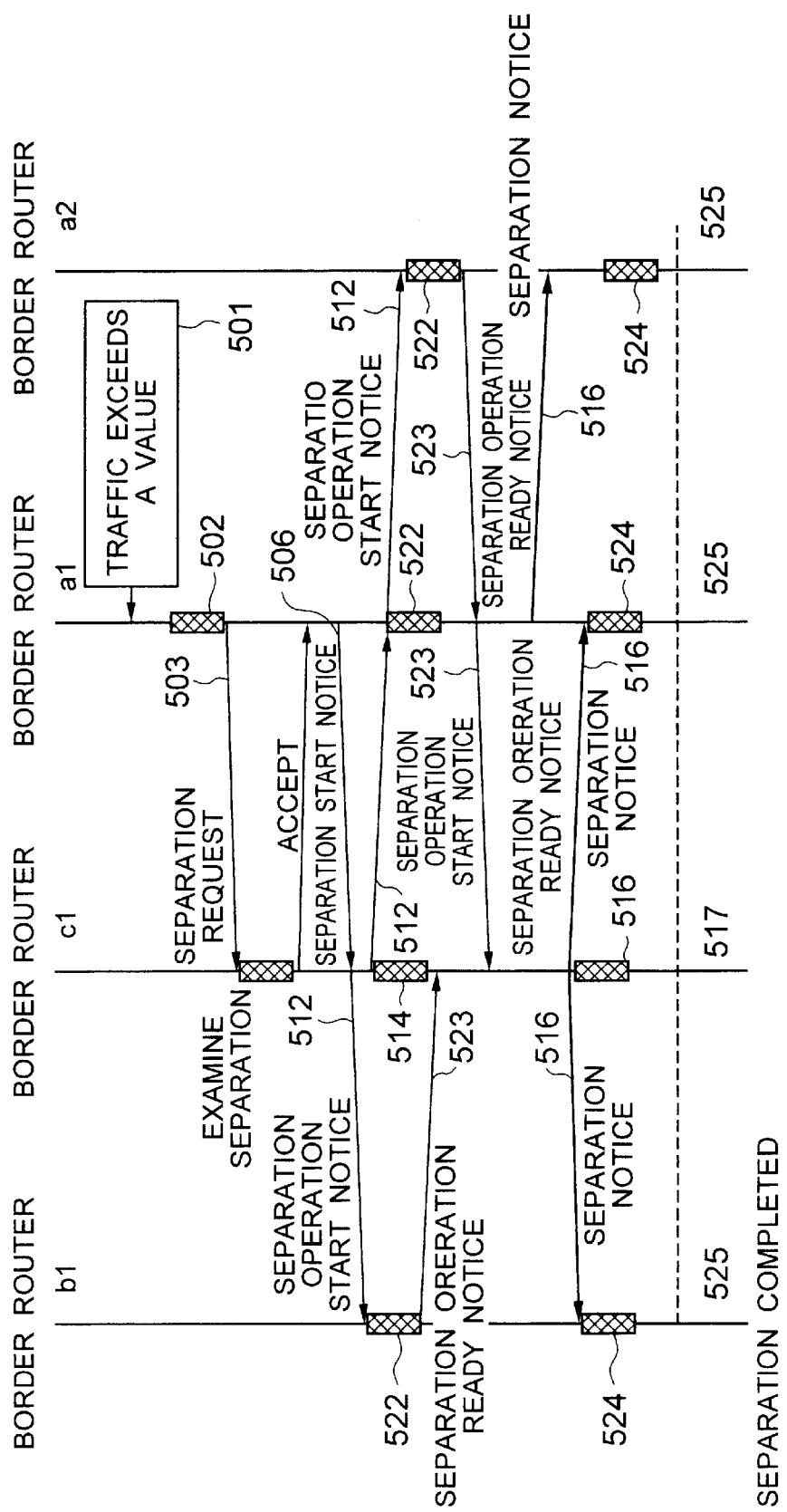
FIG. 11 shows a signal sequence between border routers in group separation.

A description will be first made of the case of separating an autonomous system (AS) from a group with reference to FIGS. 8 through 11. FIG. 8 is a flowchart for processing the request that a border router makes for separating an AS from a group, FIG. 9 is a flowchart for the process a border router makes in the AS to be separated, and FIG. 10 is a flowchart for the process border routers make in the ASs to stay in a group. FIG. 11 shows a signal sequence between border routers associated with the separation from a group. Here, for example, the signal sequence between the border routers (a1) 11, (a2) 12, (b1) 21, (c1) 31 in the network structure shown in FIG. 1 is shown when the border router (a1) 11 of the AS-A10 in group 1 sends a request to separate the AS-C30 from group 1. In FIG 11, numbers correspond to the step numbers in FIGS. 8 through 10.

The operation of the separation from group will be described in detail with reference to FIG. 11. Since the border routers (a1) 11, (a2) 12, (b1) 21, (c1) 31 in FIG. 11 are provided within the same group, or group 1, the transmission and reception of necessary information is performed according to the intragroup protocol.

When the border router (a1) 11 of group 1 detects that its own amount of traffic exceeds a predetermined value (step 501), it extracts the AS of less traffic within this group (step 502), and sends a separation request to the border router of this AS (step 503). Here, it is assumed that the border router (a1) 11 has sent the separation request to the border router (c1) 31 of the AS-C30. The border router (c1) 31 examines if the AS-C30 can be separated from group 1, and informs the border router (a1) 11 of the fact that it is acceptable or unacceptable. The border router (a1) 11 decides if the answer from the border router (c1) 31 is acceptable or unacceptable (step 504). If it is acceptable, the border router (a1) 11 sends a separation start notice to the border router (c1) 31 (step 506). FIG. 11 shows this case. When the answer of "unacceptable" is sent back from the border router (c1) 31, the border router (a1) 11 decides if the group has an AS to be extracted next (step 505). If it has, the border router (a1) 11 sends a separation request to the border router of that AS. If not, the separating operation stops at this time (step 507).

When the border router (c1) 31 of the AS-C30 to be separated receives the separation start notice from the border router (a1) 11 (step 511), it sends a separating operation start notice to the border routers (a1) 11, (a2) 12, (b1) 21 of the AS-A10, AS-B20 adjacent to the AS-C30 within the group 1 (step 512), and waits for a separating operation ready notice 523 to be sent (step 513). At the same time, the border router (c1) 31 makes it ready to renew the default path and change the routing table (step 514). If it is confirmed that all the AS-A10, AS-B20 and own AS-30 adjacent to each other within the group 1 are ready for the separating operation (step 515), the border router (c1) 31 sends a separation notice to the border routers (a1) 11, (a2) 12, (b1) 21, and executes the renewal of default path and change of the routing table (step 516). The border router (c1) 31 thus completes the separating process (step 517).

When the border routers (a1) 11, (a2) 12 of the AS-A10 and the border router (b1) 21 of the AS-B20 which stay in the group 1 receive the separating operation start notice from the border router (c1) 31 (step 521), they make it ready to renew the default path and change the routing table (step 522), and send the separating operation ready notice back to the border router (c1) 31 (step 523). If receiving the separation notice from the border router (c1) 31, they execute the renewal of the default path and change of the routing table (step 524). Thus, the separation process in the AS-A10, AS-B20 that stay in the group 1 can be completed in association with the separation of the AS-C30 from the group 1 (step 525).

Figure 12:
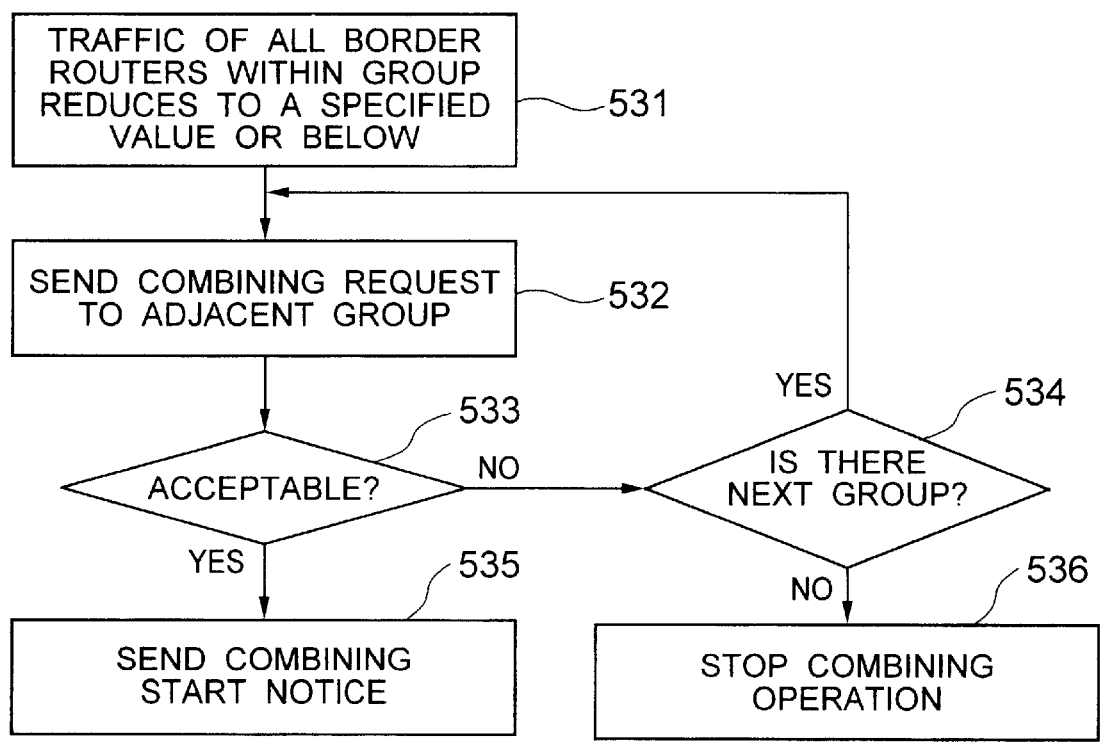
FIG. 12 is a flowchart for request to couple to a group.
Figure 13:
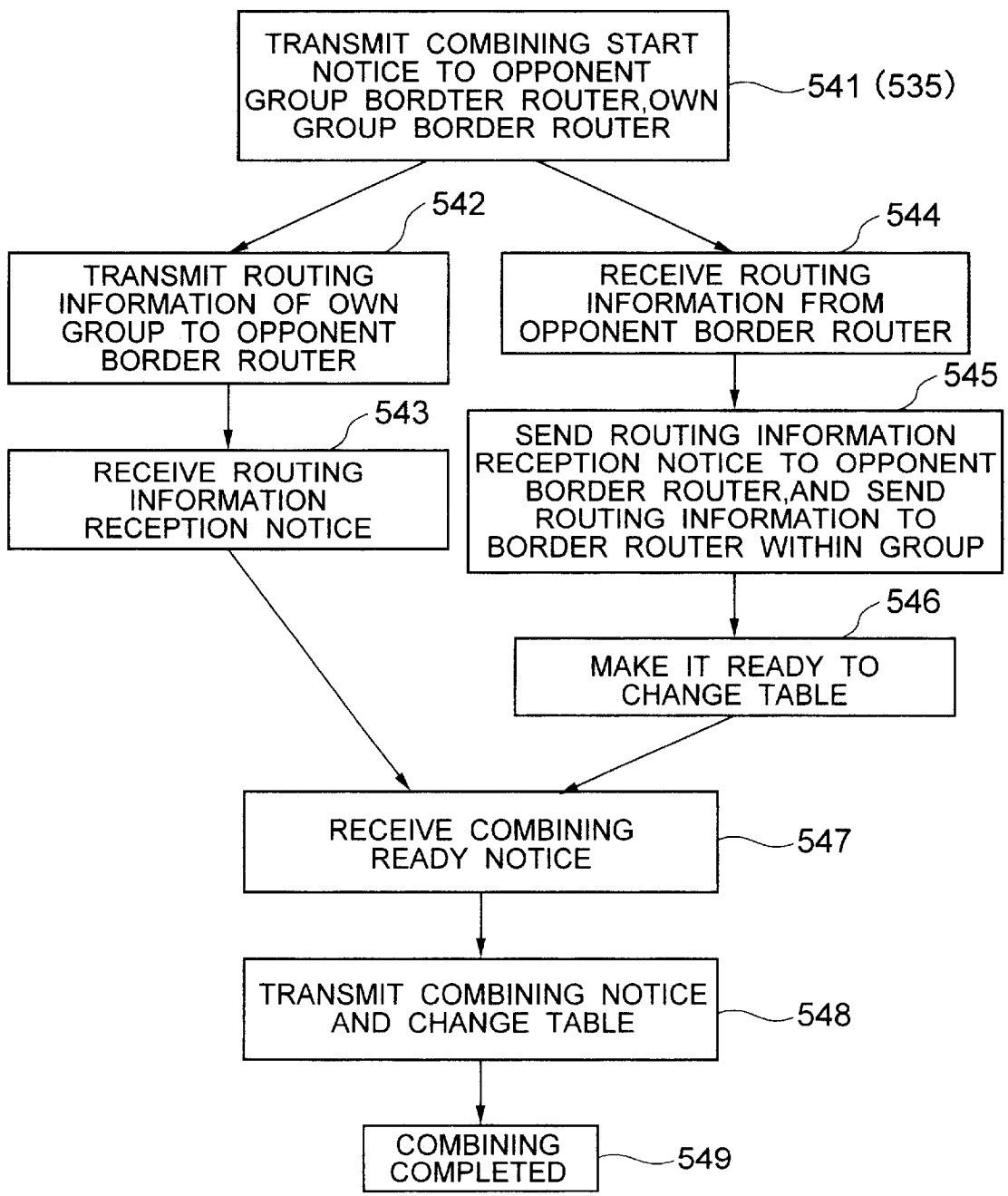
FIG. 13 is a flowchart for coupling operation in a requesting border router.
Figure 14:
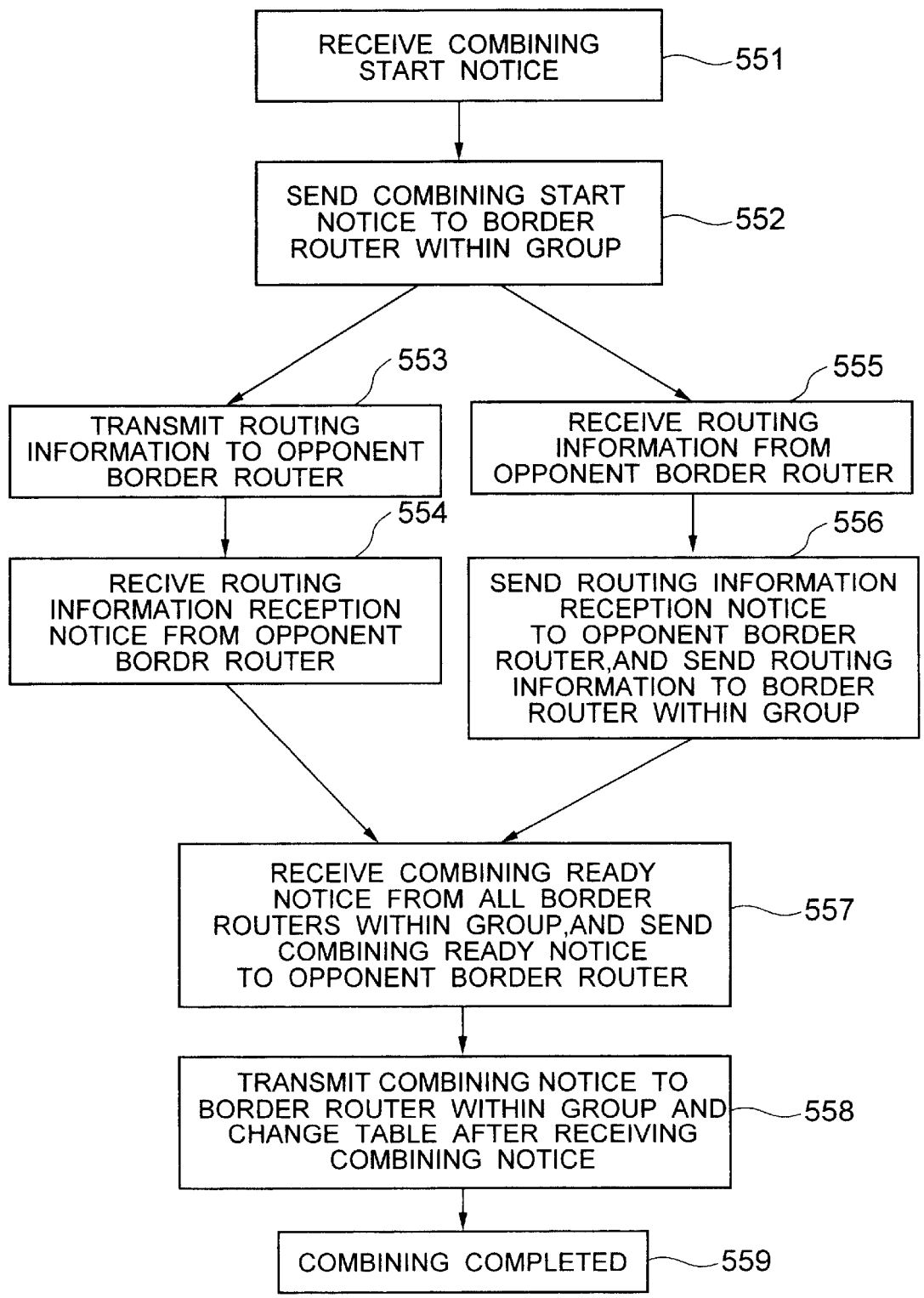
FIG. 14 is a flowchart for coupling operation in the opponent group border router.
Figure 15:
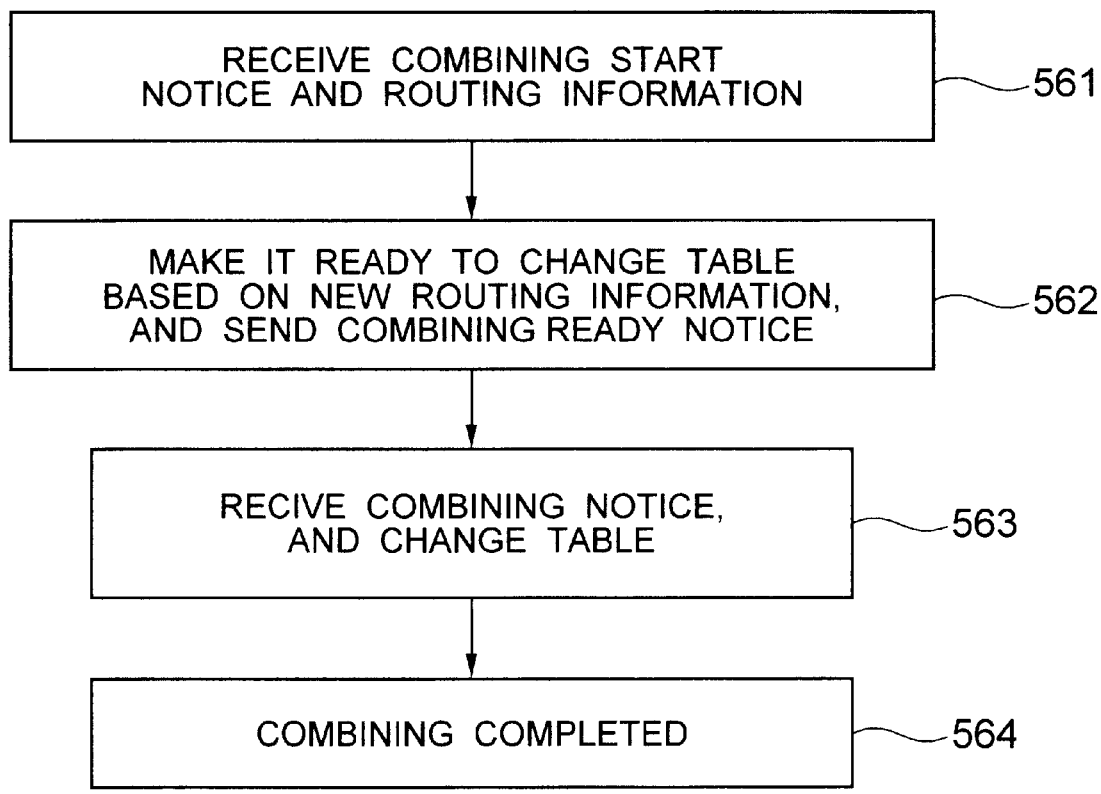
FIG. 15 is a flowchart for coupling operation in the other border routers.
Figure 16:
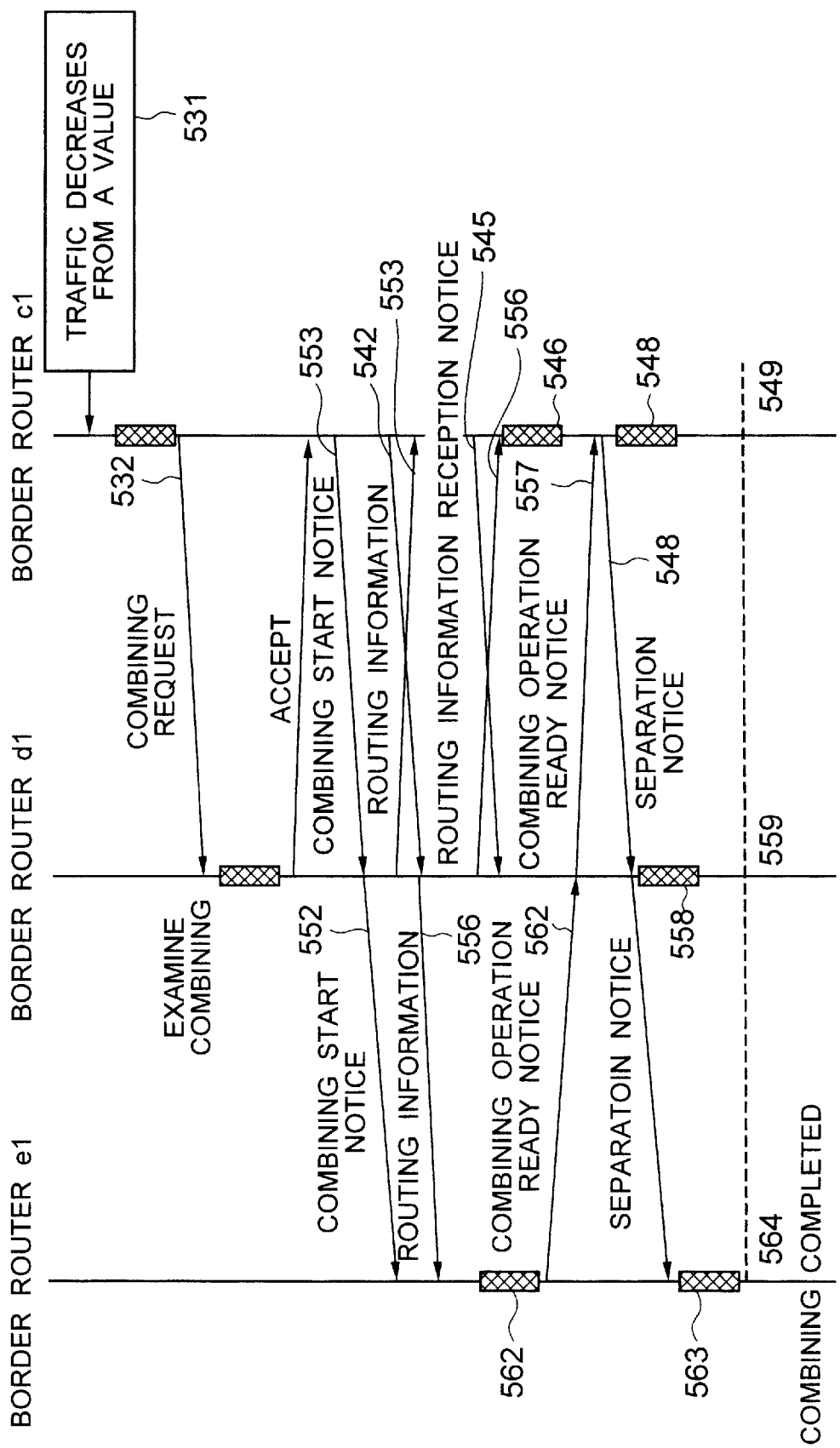
FIG. 16 shows a signal sequence between border routers in coupling between groups.

A description will be made of the case of combining (integrating) an autonomous system into a group with reference to FIGS. 12 through 16. FIG. 12 is a flowchart for processing a combining request from a border router, FIG. 13 is a flowchart for the combining process in the border router that sends the request for combining AS into a group, FIG. 14 is a flowchart for the combining process in the opponent group border router, and FIG. 15 is a flowchart for the combining process in other border routers. FIG. 16 is a diagram showing a signal sequence between the border routers in the case of combining. Here, for example, the signal sequence between the border routers (c1) 31, (d1) 41, (e1) 51 in the network structure shown in FIG. 1 is shown when the AS-C30 is combined into the group 2. In FIG. 16, numbers correspond to the step numbers in FIGS. 12 through 15.

The operation of the coupling between groups will be described in detail with reference to FIG. 16. It is assumed that in the network structure of FIG. 1, the AS-C30 is separated from group 1 by the separation processing mentioned with reference to FIGS. 8 to 11, and forms by itself another group different from the group 1 formed of AS-A10 and AS-B20 and group 2 formed of AS-D40 and AS-E50. Therefore, the border router (c1) 31 and border routers (d1) 41, (e1) 51 transmit and receive necessary information to and from each other by use of an intergroup protocol as shown in FIG. 16. Since the border routers (d1) 41 and (e1) 51 belong to the same group, or group 2, the transmission and reception of necessary information therebetween are performed by use of an intragroup protocol.

When the border router (c1) 31 of the autonomous system AS-C30 detects that the traffic decreases to a predetermined value or below (step 531), it sends a combining request notice to a border router of the adjacent group (step 532). Here, the border router (c1) 31 sends the combining request notice to the border router (d1) 41 of AS-D40 of group 2. The border router (d1) 41 examines if the AS-C30 can be combined into the group 2, and informs the border router (c1) 31 of the fact that it is acceptable or unacceptable. The border router (c1) 31 decides if the answer from the border router (d1) 41 is acceptable or unacceptable (step 533). If it is acceptable, the border router (c1) 31 sends a combining start notice to the border router (d1) 41 (step 535). FIG. 7 shows this case. If the answer from the border router (d1) 41 is unacceptable, the border router (c1) 31 decides if there is the next adjacent group. If there is, the combining request notice is transmitted to a border router of the corresponding group. If not, the combining operation stops at this time (step 536).

The border router (c1) 31 of the AC-C30 sends a combining start notice to the border router (d1) 41 of the AS-D40 of the opponent group 2, and also sends it to the border routers of other ASs within the own group as at step 541 in FIG. 13. Since it is here assumed that the AS-C30 is already separated from the group 1 and forms a group by itself, the transmission and reception of signal between the border router (c1) 31 and border router (a1) 11, (b1) 21 are not necessary.

After the border router (c1) 31 sends the combining start notice to the border router (d1) 41 of the AS-D40 of the opponent group 2, it transmits routing information to the border router (d1) 41 (step 542), and receives a routing information reception notice from the border router (d1) 41 (step 543). When receiving the combining start notice, the border router (d1) 41 sends routing information to the border router (c1) 31. The border router (c1) 31 receives it (step 544), and sends a routing information reception notice to the border router (d1) 41 (step 545). Then, when the border router (c1) 31 makes it ready to change the routing table (step 546), and receives a combining ready notice from the border router (d1) 41 of the opponent group 2 (step 547), it sends a combining notice to the border router (d1) 41, and changes the own routing table (step 548). Thus, the combining process in the border router (c1) 31 is completed (step 549).

When the border router (c1) 41 of the AS-D40 of the opponent group 2 receives the combining start notice from the border router (c1) 31 (step 551), it first sends a combining start notice to the opponent border router (e1) 51 of the group 2 (step 552). Then, the border router (d1) 41 sends routing information to the border router (c1) 31 (step 553), and the border router (c1) 31 receives the routing information reception notice (step 554). At the same time, the border router (d1) 41 receives routing information from the border router (c1) 31 (step 555), and sends a routing information reception notice to the border router (c1) 31 and the routing information to the border router (e1) 51 within the group 2 (step 556). Thereafter, when the border router (d1) 41 receives the combining ready notice from the border router (e1) 51 within the group 2, it sends a combining ready notice to the border router (c1) 31 (step 557). When receiving the combining notice from the border router (c1) 31, the border router (d1) 41 sends the combining notice to the border router (e1) 51, and changes the own routing table (step 558), thus completing the combining process (step 559).

When the border router (e1) 51 of the AS-E50 within the same group as the border router (d1) 41 of AS-D40 receives the combining start notice and then receive the routing information from the border router (d1) 41 (step 561), the border router (e1) 51 makes it ready to change the routing table on the basis of the new routing information, and send a combining ready notice to the border router (d1) 41 (step 562). When receiving the combining notice from the border router (d1) 41, the border router (e1) 51 changes the own routing table (step 563), completing the group combining process (step 564).

Figure 17:
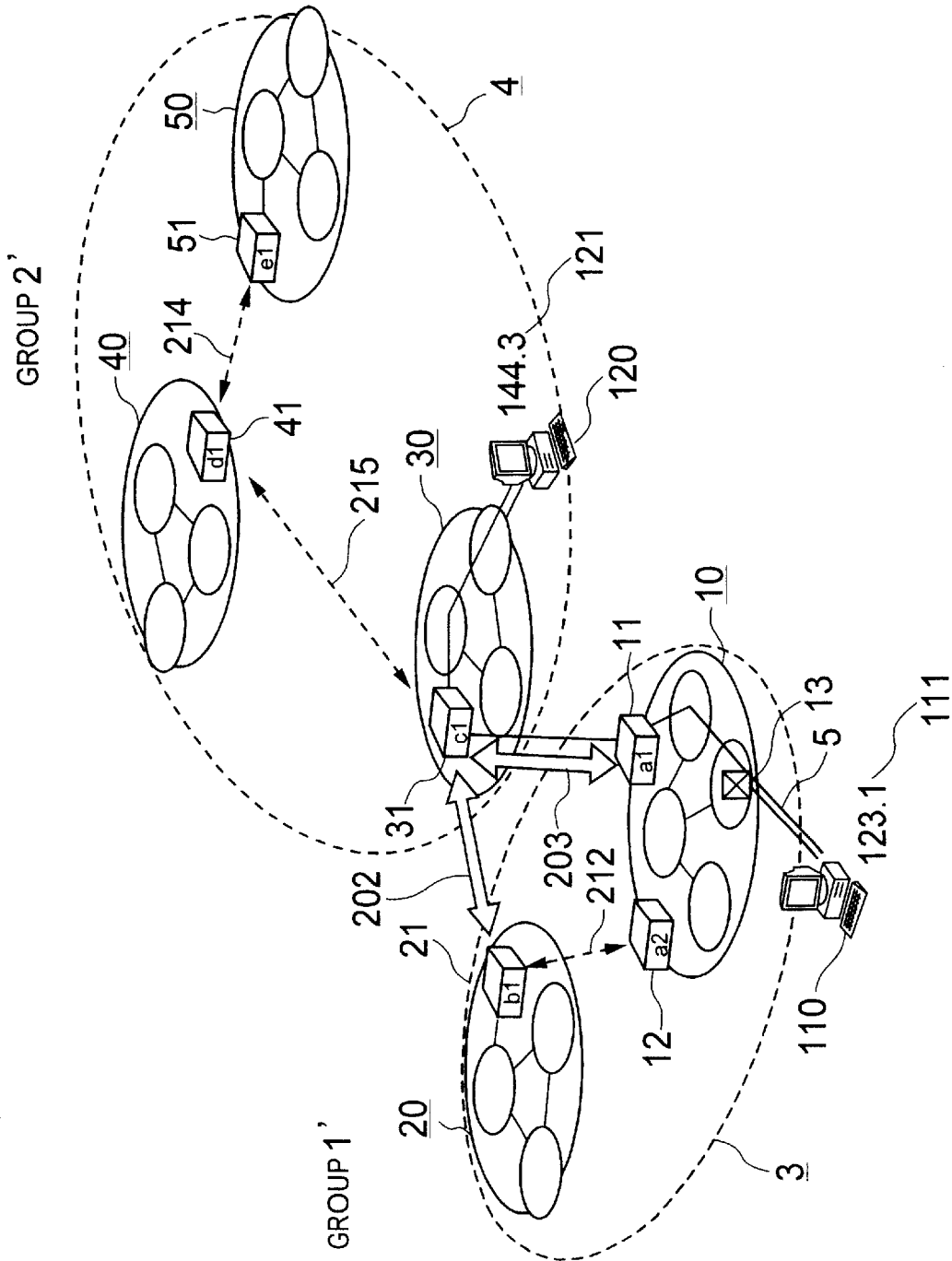
FIG. 17 shows an example of a network structure resulting from changing the ASs in the groups of the network shown in FIG. 1.

FIG. 17 shows that in the network structure of FIG. 1, the autonomous system AS-C30 is separated from group 1 and then combined (consolidated) into group 2. In FIG. 17, group 1' is formed of the autonomous systems AS-A10 and AS-B20, and group 2' formed of the autonomous systems AS-C30, AS-D40 and AS-E50.

FIGS. 18A–18F show the routing tables of border routers (a1) 11, (a2) 12, (b1) 21, (c1) 31, (d1) 41 and (e1) 51 in the network structure of FIG. 17. If we pay attention to the border router (a1) 11, it will be found that the routing information of its routing table is decreased from "2081" as in table 401 shown in FIG. 5A to "1324" as in table 421 shown in FIG. 18A. That is, the searching time can be decreased by separating the AS-C30 from group 1. On the other hand, the routing information of the routing table of border router (d1) 41, (e1) 51 is increased from "794" to "1551" by combining the AS-C30 into group 2, but the whole network can be balanced.

Figure 19:
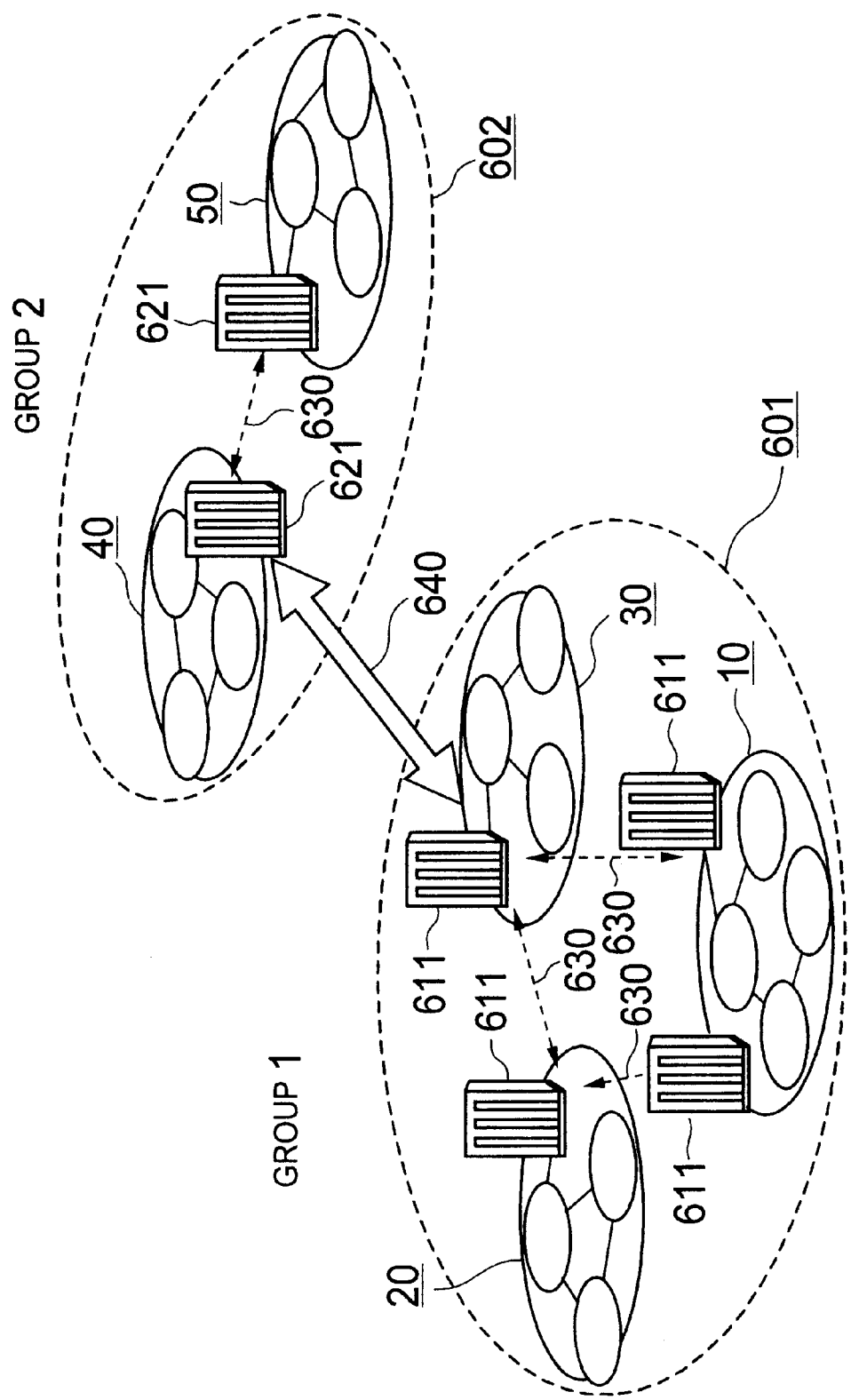
FIG. 19 shows another embodiment of the invention in which address information is shared by processors that communicate with each other.

FIG. 19 shows another embodiment of the invention in which the processors on the network are grouped on a communication basis. In FIG. 19, reference numeral 611 represents a processor associated with group 1, and 621 associated with group 2. The processors 611 within group 1, and the processors 621 within group 2 communicate with each other within each group by use of an intragroup protocol 630 like the border routers within a group. The processors 611 and 621 opposed over groups 1 and 2 transmit and receive information to and from each other by use of an intergroup protocol 640 like the border routers of different groups. When a load is applied on an own group, the neighboring processors are brought into the own group, reducing the load on all the group.

According to the invention, in the network structure with a plurality of autonomous systems interconnected such as the Internet, fast routing is possible, and the processors on the network can be smoothly made to communicate with each other. Moreover, relatively small-scale internet providers that are individually managed and operated can also be made to communicate with each other.

What is claimed is:

1. A router comprising:

means for monitoring a traffic amount and detecting that the traffic amount has exceeded a predetermined value;

means for transmitting a notice requesting separation of its own network to a router of another network connected to the own network, when said monitoring and detecting means detects that the traffic amount has exceeded the predetermined value;

means for changing routing information of its own table, when receiving a notice of completion of separation from a border of another network; and means for transmitting a notice of completion of separation to a router of another network that transmitted a notice requesting separation of said another network, after said changing means changes the routing information of the own table in response to reception of the notice requesting separation of said another network.

2. A network having a plurality of individually managed and operated networks (hereinafter, referred to as autonomous systems) interconnected, at least one of said autonomous systems being grouped, each of said autonomous systems including at least one border comprising:

means for monitoring a traffic amount and detecting that the traffic amount has exceeded a predetermined value;

means for transmitting a notice requesting separation of its own network to a router of another network connected to the own network, when said monitoring and detecting detects that the traffic amount has exceeded the predetermined value;

means for changing routing information of its own table, when receiving a notice of completion of separation from a border of another network; and means for transmitting a notice of completion of separation to a router of another network that transmitted a notice requesting separation of said another network, after said changing means changes the routing information of the own table in response to reception of the notice requesting separation of said another network.

* * * * *